(12) United States Patent
Kobayashi

(10) Patent No.: US 8,307,522 B2
(45) Date of Patent: Nov. 13, 2012

(54) MACHINE TOOL AND PALLET STANDBY STATION

(75) Inventor: Satoshi Kobayashi, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 914 days.

(21) Appl. No.: 12/439,026

(22) PCT Filed: Sep. 4, 2006

(86) PCT No.: PCT/JP2006/317915
§ 371 (c)(1),
(2), (4) Date: Feb. 26, 2009

(87) PCT Pub. No.: WO2008/029482
PCT Pub. Date: Mar. 13, 2008

(65) Prior Publication Data
US 2009/0206225 A1    Aug. 20, 2009

(51) Int. Cl.
*B23Q 7/00* (2006.01)

(52) U.S. Cl. .......................... 29/33 P; 269/309; 269/900

(58) Field of Classification Search .................... 29/33 P, 29/563; 269/309–310, 900; 198/345.3, 346.1
See application file for complete search history.

(56) References Cited

U.S. PATENT DOCUMENTS

| | | | | |
|---|---|---|---|---|
| 2,676,413 A * | 4/1954 | Wharton et al. | ............... | 269/900 |
| 4,583,631 A * | 4/1986 | Yonezawa et al. | ......... | 198/345.3 |
| 4,662,503 A | 5/1987 | Lycke | | |
| 4,934,680 A * | 6/1990 | Schneider | ...................... | 269/309 |
| 5,065,991 A * | 11/1991 | Schneider | ...................... | 269/309 |
| 5,415,384 A * | 5/1995 | Obrist et al. | ................... | 269/309 |
| 5,630,577 A * | 5/1997 | Tankersley | .................... | 269/309 |
| 5,788,225 A * | 8/1998 | Iwata et al. | ..................... | 269/309 |
| 6,000,113 A * | 12/1999 | Owariya | ........................ | 29/33 P |
| 6,089,557 A | 7/2000 | Obrist | | |
| 6,095,509 A | 8/2000 | Yonezawa | | |
| 6,527,266 B1 * | 3/2003 | Yonezawa et al. | ............ | 269/309 |
| 6,615,102 B1 | 9/2003 | Morfino | | |

FOREIGN PATENT DOCUMENTS

| | | |
|---|---|---|
| CN | 2088008 U | 11/1991 |
| CN | 1170654 A | 1/1998 |
| CN | 1426872 A | 7/2003 |
| CN | 2592587 Y | 12/2003 |

(Continued)

*Primary Examiner* — Erica E Cadugan
(74) *Attorney, Agent, or Firm* — Paul & Paul

(57) ABSTRACT

A machine tool and pallet standby station using a crane for changing a pallet between a table or pallet mounting table (27) of the machine tool and the pallet standby station are provided. The table (27) includes a plurality of guide pins (31) having tapered front ends, a plurality of elevatable lift pins (35) having spherical front ends, and a plurality of taper cones (37) having tapered outer peripheral surfaces. On the other hand, the pallet (P) includes at least two brackets (39) attached so as to project in the side directions from the two side surfaces of the pallet, and each bracket is formed with a guide hole (41) into which a guide pin (31) is inserted for rough positioning of the pallet. Further, the bottom of the pallet (P) is formed with a plurality of locate holes (45) having tapered inner peripheral surfaces and engaging with the spherical front ends of the lift pins for precision positioning of the pallet and a plurality of taper holes (47) having shapes complementary with the taper cones (37) and engaging with the taper cones for final positioning of the pallet.

4 Claims, 5 Drawing Sheets

FOREIGN PATENT DOCUMENTS

| | | |
|---|---|---|
| GB | 2123721 A | 2/1984 |
| JP | 07100722 A | 4/1995 |
| JP | 818216 B2 | 2/1996 |
| JP | 10058258 A | 3/1998 |
| JP | 11188551 A | 7/1999 |
| JP | 3307477 | 5/2002 |
| JP | 2002-520709 A | 7/2002 |
| WO | 00/03312 A1 | 1/2000 |
| WO | 2006031265 A1 | 3/2006 |

* cited by examiner

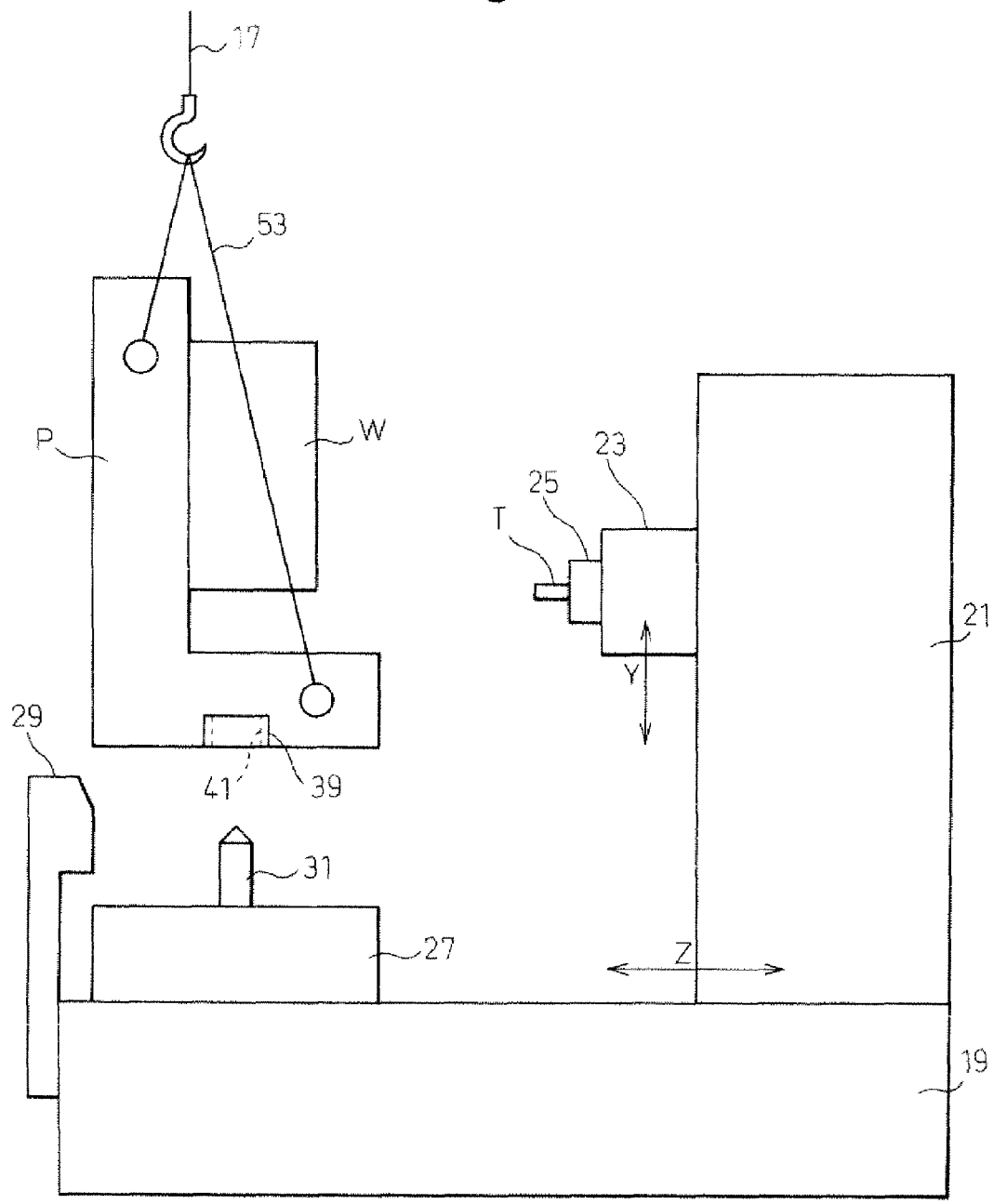

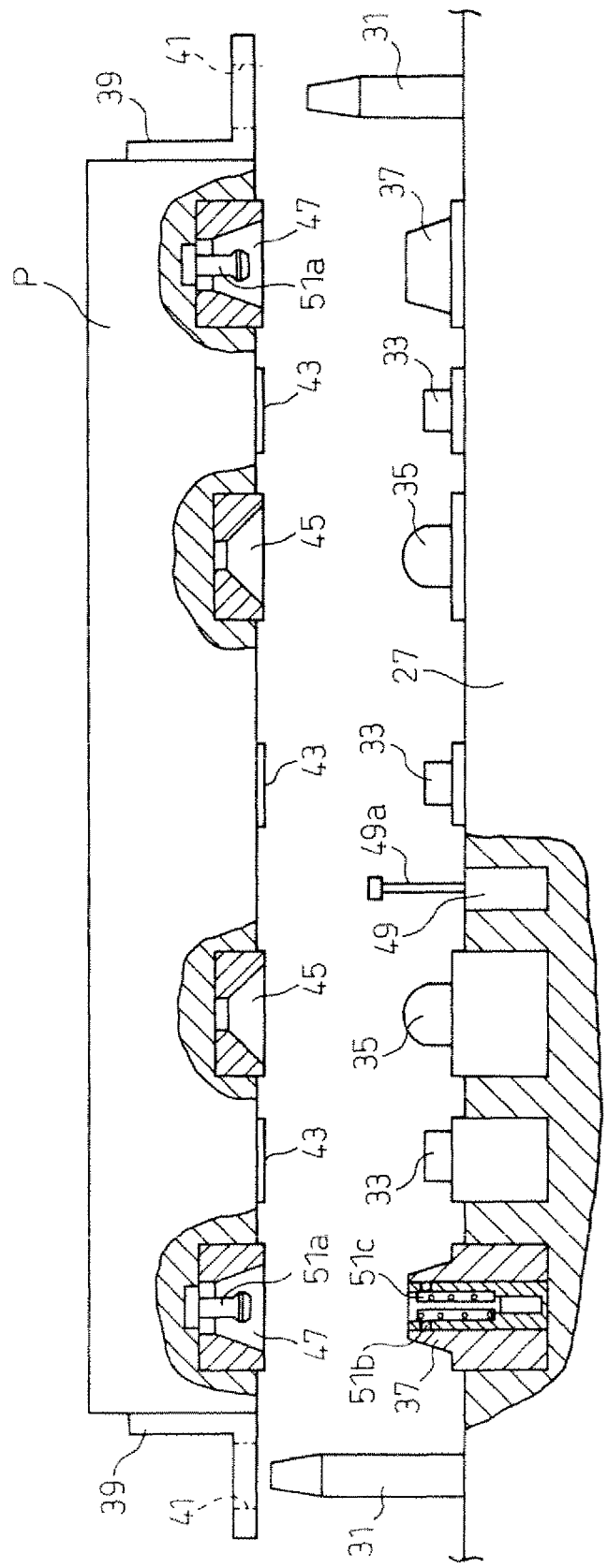

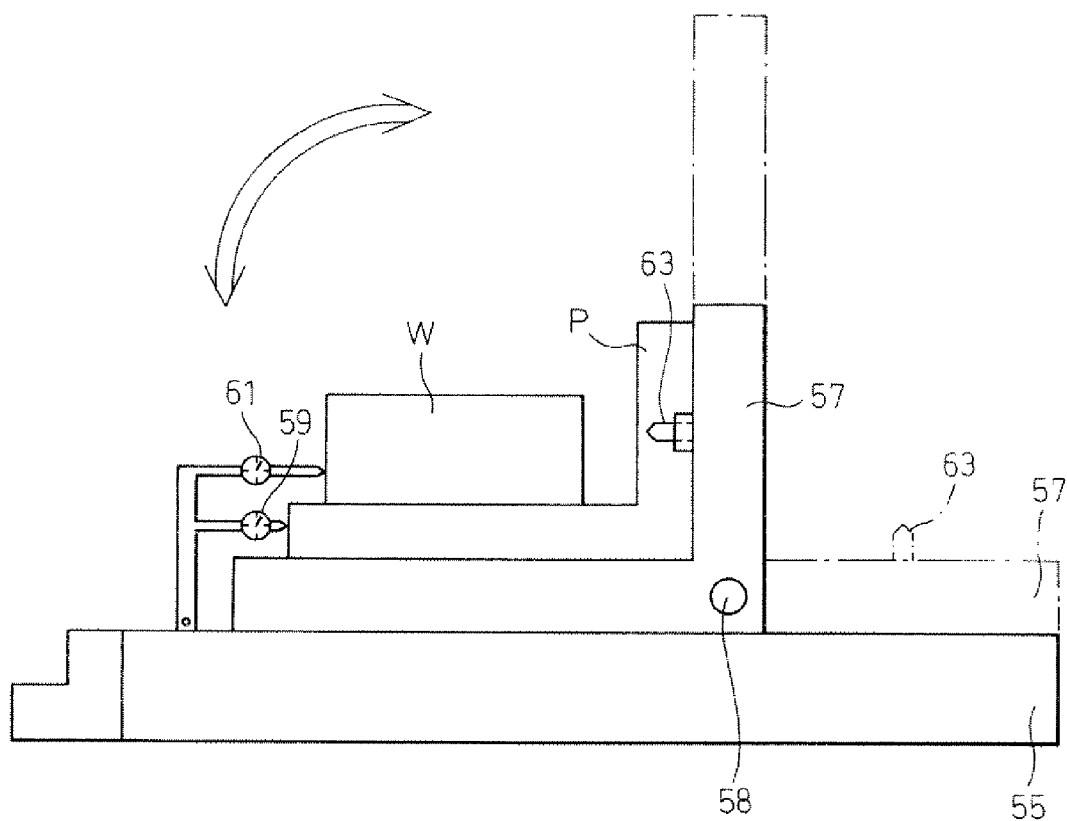

MACHINE TOOL AND PALLET STANDBY STATION

TECHNICAL FIELD

The present invention relates to a machine tool and pallet standby station using a crane to change pallets between a pallet mounting table of a machine tool and a pallet standby station.

BACKGROUND ART

In a machine tool, when a workpiece finishes machining, the pallet having the machined workpiece mounted thereon is dismounted from a table or pallet mounting table of the machine tool and conveyed to a setup position or other pallet standby station, while another pallet having a setup workpiece mounted thereon is mounted on the table of the machine tool, thereby changing pallets between the table of the machine tool and the pallet standby station. Pallets are changed using an automatic pallet change system or manually by a worker using a crane etc. In each case, for good precision machining, the pallet has to be accurately arranged at a predetermined position on the table or pallet standby station.

For such positioning, various methods may be used. For example, Japanese Patent Publication (B2) No. 8-18216 discloses a method of positioning a pallet and a pallet support table in a pallet transfer system using a stacker crane by making knock pins provided on the pallet support table engage with holes provided in the bottom of the pallet. Further, Japanese Patent No. 3307477 discloses a method of making taper outer peripheral surfaces of front ends of a plurality of piston members provided on a table engage with a plurality of taper holes provided in the bottom of a pallet for rough positioning and then making a plurality of taper cones provided on the table and a plurality of taper holes provided in the bottom of the pallet engage for main positioning.

On the other hand, installation of an automatic pallet change system requires a large space for at least the conveyance of pallets and transfer of pallets. Therefore, when sufficient space cannot be secured, it is not possible to install an automatic pallet change system. Further, an automatic pallet change system requires a complicated mechanism and is high in price, and therefore this is not suited to cases where costs have to be kept down. In this case, a worker manually operates a crane etc. to hoist a pallet from the pallet standby station and move it to above the table and to lower the pallet while arranging the pallet at a predetermined position on the table to thereby change pallets.

In this regard, the positioning method disclosed in Japanese Patent Publication (B2) No. 8-181216 and Japanese Patent No. 3307477 utilizes holes provided in the bottom of the pallets. Therefore, when a worker manually operates a crane to position a pallet, visual recognition of holes is difficult and guiding the holes provided in the bottom of the pallet to the positions of pins on the table requires skill and takes time.

DISCLOSURE OF THE INVENTION

Accordingly, an object of the present invention is to provide a machine tool and pallet standby station enabling use of a manually operated crane to easily arrange a pallet at a predetermined position on a machine tool or pallet standby station.

According to the present invention, there is provided a machine tool having a pallet mounting table for placing a pallet thereon, wherein the pallet mounting table includes a plurality of guide pins having tapered front ends, an elevatable lift pin having a spherical front end, and a taper cone having a tapered outer peripheral surface; the pallet includes at least two brackets provided on side surfaces of the pallet so as to project in the side directions from two side surfaces of the pallet; each bracket is formed with a guide hole into which a guide pin is inserted for rough positioning of the pallet; and a bottom surface of the pallet is formed with a locate hole having a tapered inner peripheral surface and engaging with the spherical front end of the lift pin for precision positioning of the pallet and a taper hole having a complementary shape with the taper cone and engaging with the taper cone for final positioning of the pallet.

In the machine tool according to the present invention, since the rough positioning guide holes of the pallet are provided in the brackets attached so as to project from the two side surfaces of the pallet, a worker can easily visually recognize the guide holes. Therefore, even when using a manually operated crane to move a pallet, a worker can easily guide the guide holes of the pallet to the guide pins on the pallet mounting table, so rough positioning of the pallet by a worker becomes easy. Further, even if the position of a pallet is somewhat off from a horizontal position of the target position on the table, it is easy to engage the spherical front end of the lift pin with the tapered inner peripheral surface of the corresponding locate hole of the pallets. If making these engage with each other, it is possible to precisely arrange the pallet at the target position on the table. Further, since the taper cone on the table and the corresponding taper hole of the pallet are complementary in shape, the pallet is accurately arranged at the target position on the table if making these engage with each other.

In the above machine tool, preferably, the pallet mounting table is provided with an elevatable support pin having a flat front end surface and the bottom surface of the pallet is provided with a flat support pin abutting surface abutting against the flat front end surface of the support pin. By making this support pin and the corresponding support pin abutting surface abut against each other, the pallet is held horizontal with respect to the top surface of the table and the effect is exhibited that engagement of the spherical front end of the lift pin and the tapered inner peripheral surface of the locate hole and engagement of the taper cone and the taper hole are facilitated. Further, when lowering the pallet, the support pin has a cushioning action and a function to prevent damage to the lift pin and taper cone.

Further, preferably, the machine tool further includes a stopper abutting against the side surface of the pallet to stop the pallet at a predetermined position on the pallet mounting table. By making the side surface of the pallet abut against this stopper, it is possible to determine the coordinates of the pallet along one axis in the horizontal direction. By just making the pallet move in the other axial direction in the horizontal plane, it becomes possible to guide the guide holes over the guide pins.

There is provided a pallet standby station of a machine tool for placing a pallet thereon, which includes a plurality of guide pins having tapered front ends at positions corresponding to guide holes of the pallet, an elevatable lift pin having a spherical front end at a position corresponding to a locate pin of the pallet, and a taper cone having a tapered outer peripheral surface at a position corresponding to a taper hole of the pallet. In this case, it similarly becomes possible to accurately position a pallet on the pallet standby station.

BRIEF DESCRIPTION OF THE DRAWINGS

FIG. 2 is a schematic view showing the overall configuration of a machine tool side of the machining system of FIG. 1.

FIG. 3 is a partial cross-sectional side view showing details of the positioning structure of the pallet and table shown in FIG. 2.

FIG. 5 is a schematic view showing the overall configuration of the pallet standby station side of the machining system of FIG. 1.

BEST MODE FOR CARRYING OUT THE INVENTION

A preferred embodiment of the present invention will be described below with reference to the accompanying drawings.

Figure 1:
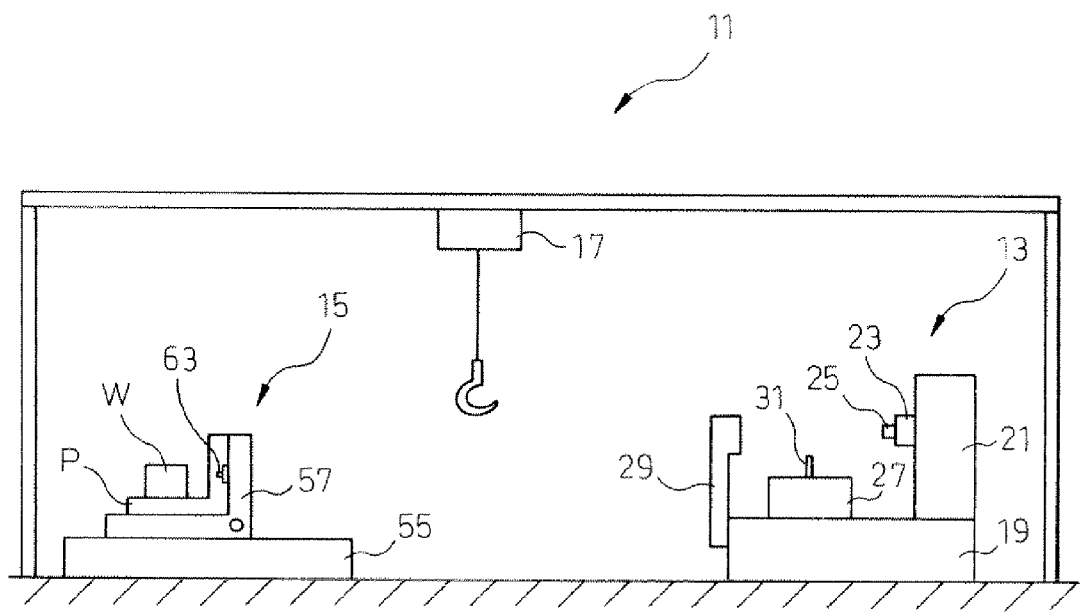
FIG. 1 is a schematic view showing the overall configuration of a machining system using a machine tool and a standby station according to the present invention.

Referring to FIG. 1, a machining system 11 using a machine tool and a standby station according to the present invention is comprised of a machine tool 13, a pallet standby station 15, and a pallet conveyance system for conveying a pallet P having a workpiece W mounted thereon between machine tool 13 and pallet standby station 15. Pallet standby station 15 is the place for keeping a pallet P on standby for conveyance to a pallet mounting table, that is, a table 27, of machine tool 13 and includes a setup station for setup work including mounting workpiece W on pallet P and a table of a machine tool performing a previous machining process.

The pallet conveyance system is comprised of a suspension type crane 17 which is movable between machine tool 13 and pallet standby station 15 and manually operated by a worker. However, the pallet conveyance system need only convey pallet P between machine tool 13 and pallet standby station 15, and an automatically operated crane, automatic pallet change system, or other type of pallet conveyance system can be used as the pallet conveyance system.

As machine tool 13, for example, it is possible to use a machining center. Referring to FIG. 2, machine tool 13 includes a bed 19 installed on a floor, a column 21 provided on bed 19, a spindle head 23 supported by column 21, a spindle 25 supported rotatably on spindle head 23 and having a tool T mounted thereon, and a table 27 provided on bed 19. In the illustrated embodiment, column 21 can move on bed 19 in a Z-axis direction (left-right direction in FIG. 1), spindle head 23 can move on column 21 in a Y-axis direction (vertical direction in FIG. 1), and table 27 can move on bed 19 in an X-axis direction perpendicular to the Y-axis and Z-axis (direction vertical to paper surface in FIG. 1). However, machine tool 13 may also have another configuration and is not limited to the illustrated embodiment.

On bed 19 of machine tool 13, a stopper 29 is provided, so that the Z-axis position of pallet P on bed 19 or table 27 is restricted by making the back surface (side surface) of pallet P moved by crane 17 abut against stopper 29.

Next, referring to FIG. 3, the positioning structure for positioning pallet P on table 27 will be described in detail.

There are provided on table 27 a plurality of guide pins 31 extending in the vertical direction and having tapered front ends, a plurality of elevatable support pins 33 having flat front end faces, a plurality of lift pins 35 having spherical front ends and able to be elevated independent from support pins 33, and a plurality of fixed taper cones 37 having tapered outer peripheral surfaces. Support pins 33 and lift pins 35 are elevated by for example cylinder devices and can be locked in predetermined positions by lock devices. On the other hand, pallet P has a plurality of L-shaped brackets 39 attached to two side surfaces of pallet P in the longitudinal direction. The parts of L-shaped brackets 39 projecting in the side directions from the two side surfaces or pallet P are formed with guide holes 41 into which guide pins 31 are inserted. Further, a bottom surface of pallet P is formed with flat support pin abutting faces 43 against which the flat front end faces of support pins 33 abut, locate holes 45 having tapered inner peripheral surfaces and engaging with spherical front ends of lift pins 35, and taper holes 47 having complementary shapes with taper cones 37 and engaging with taper cones 37, corresponding to support pins 33, lift pins 35, and taper cones 37.

The positions of guide pins 31 are set so that pallet P is placed at generally the desired position on table 27 when guide pins 31 of table 27 are inserted into guide holes 41 of pallet P. Guide pins 31 are preferably different in lengths. Further, guide holes 41 preferably have diameters one size larger than guide pins 31. Note that, in the embodiment shown in FIG. 3, table 27 is provided with two guide pins 31, but three or more guide pins 31 may also be provided of course.

Further, the positions of support pin abutting faces 43, locate holes 45, and taper holes 47 are determined so that support pin abutting surfaces 43, locate holes 45, and taper holes 47 of pallet P are opposed to corresponding support pins 33, lift pins 35, and taper cones 37 provided on table 27 when guide pins 31 are inserted into corresponding guide holes 41 of pallet P. Furthermore, the front end faces of all of support pins 33 are positioned in the same plane when support pins 33 are at the highest elevated positions, while the front ends of all of lift pins 35 are positioned in the same plane when lift pins 35 are at the highest elevated positions.

Table 27 is further provided with a pallet position confirmation system 49 for confirming a relative position of the bottom surface of pallet P with respect to the top surface of table 27 and clamp devices 51 for clamping pallet P to table 27. In the embodiment shown in FIG. 3, pallet position confirmation system 49 includes a position detection rod 49a which is biased so as to project upward from the surface of table 27. By detecting the position of position detection rod 49a when the front end of position detection rod 49a contacts the bottom of pallet P and is pushed downward, it is detected that the top surface of table 27 and the bottom surface of pallet P are in a predetermined positional relationship. However, pallet position confirmation system 49 need only recognize the relative position between the bottom surface of pallet P and the top surface of table 27, and other types of contact type position detection systems, noncontact type position detectors using lasers or magnetism, etc. may also be used as pallet position confirmation system 49. Further, in the embodiment shown in FIG. 3, each clamp device 51 is comprised of a stud 51a extending from the bottom center of taper hole 47 and having an enlarged front end and a hole 51c formed at the center portion of taper cone 37 and having lock balls 51b inside it. When studs 51a are inserted into holes 51c, the enlarged front ends of studs 51a are locked by biased balls 51b to thereby clamp pallet P on table 27. However, clamp devices 51 need only clamp pallet P on table 27, and another structure may also be used. Further, in the embodiment shown in FIG. 3, clamp devices 51 are integrated with taper cones 37 and taper holes 47, but they may also be provided separately.

Next, referring to FIGS. 4A to 4E, the procedure for positioning pallet P with respect to table 27 shown in FIG. 2 will be described.

At pallet standby station 15, a worker attaches a conveyor wire 53 to a pallet P having a setup workpiece W mounted thereon, in order to enable pallet P to be suspended by crane 17. Next, the worker manually operates crane 17 to hoist pallet P from pallet standby station 15 and move it to above table 27 of machine tool 13. At this time, support pins 33 on table 27 are elevated. Next, the worker manually operates crane 17 to lower pallet P and finely adjusting the horizontal position of crane 17 while visually recognizing guide holes 41, thereby making guide pins 31 of table 27 be inserted into guide holes 41 of pallet P. In this way, readily visible guide holes 41 are utilized for the rough positioning of pallet P on table 27, and therefore pallet can be arranged so that support pin abutting surfaces 43, locate holes 45, and taper holes 47 are opposed to corresponding support pins 33, lift pins 35, and taper cones 37 without having to recognize the hard to see positions of support pin abutting surfaces 43, locate holes 45, and taper holes 47 at the bottom of pallet P.

In the pallet change system according to the present invention, guide holes 41 are formed on the parts, projecting in the side directions, of brackets 39 attached to the side surfaces of pallet P, and therefore the worker can easily recognize the positions of guide holes 41 and positioning of guide holes 41 and guide pins 31 becomes easy. Further, since guide pins 31 have tapered front ends and guide holes 41 have diameters one size larger than guide pins 31, guide pins 31 can be easily inserted into guide holes 41. Furthermore, in the case where guide pins 31 are different in length, the front ends of guide pins 31 differ in height. Therefore, it is possible to lower pallet P while inserting guide pins 31 into corresponding guide holes 41 one by one, whereby insertion of guide pins 31 in guide holes 41 becomes further easier. In addition, before guide pins 31 are inserted into guide holes 41, if the back surface of pallet P (rear side surface) is made to abut against stopper 29 provided on bed 19 of machine tool 13, the Z-axis direction position of pallet P (that is, the position in the left-right direction in FIG. 2) is restricted, so that guide holes 41 can be positioned above guide pins 31 by just making crane 17 move in the X-axial direction. Therefore, the crane operation becomes easier.

Figure 4A:
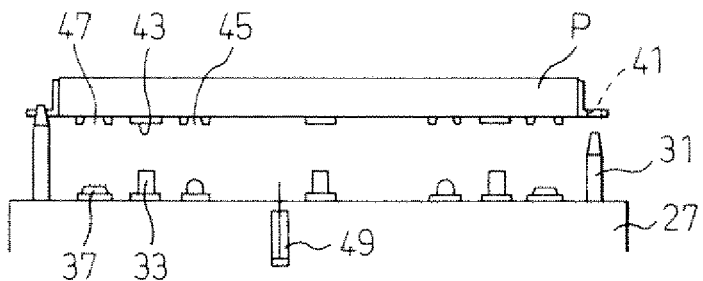
FIGS. 4A to 4E are schematic views showing a positioning procedure of a pallet and table in the machining system of FIG. 1.
Figure 4B:
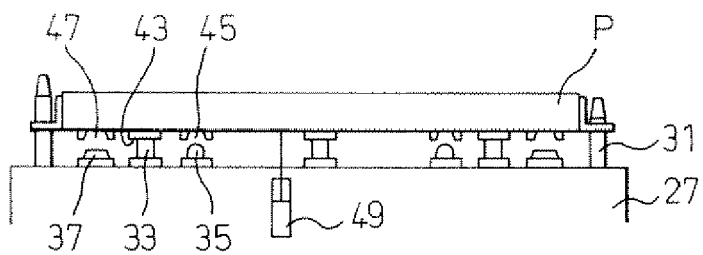

When the worker finishes inserting all of guide holes 41 of pallet P over guide pins 31 of table 27, pallet P is further lowered and, as shown in FIG. 4B, flat support pin abutting surfaces 43 of pallet P is made to abut against the flat front end surfaces of support pins 33 at the elevated position. Due to this, pallet P is supported so that the bottom surface thereof extends parallel to the top surface of table 27. At this time, locate holes 45 and taper holes 47 are respectively separated from lift pins 35 and taper cones 37 and not engaged with them. Further, by placing pallet P on support pins 33, the impact at the time pallet P contacts is absorbed by support pins 33 to prevent damage to lift pins 35 and taper cones 37. Note that, at this point of time, conveyor wire 53 is detached from pallet P, and crane 17 is moved from above machine tool 13 to a position not interfering with machining.

Figure 4C:
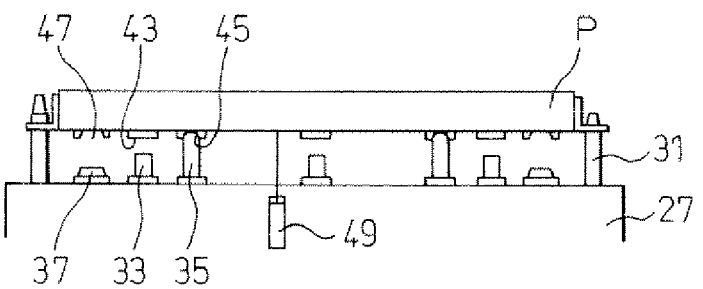

When pallet position confirmation system 49 confirms that pallet P is lowered to a position where support pin abutting surfaces 43 of pallet P abut against elevated support pins 33, as shown in FIG. 4C, the plurality of lift pins 35 are simultaneously elevated, the spherical front ends of lift pins 35 is engaged with the tapered inner peripheral surfaces of locate holes 45 and pallet P is elevated to separate from support pins 33. This being the case, the spherical faces of the front ends of lift pins 35 and the tapered inner peripheral surfaces of locate holes 45 cooperate with each other to accurately arrange pallet P at the desired horizontal position. In this way, the pallet P is precisely positioned.

Figure 4D:
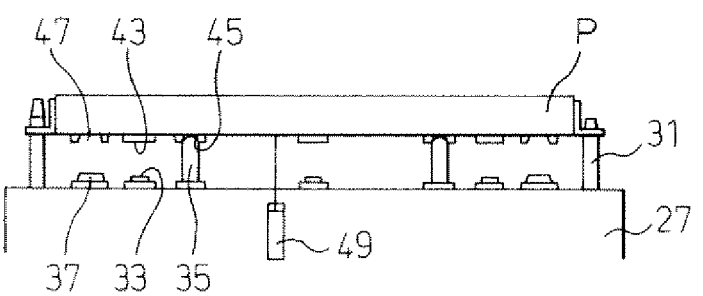
Figure 4E:
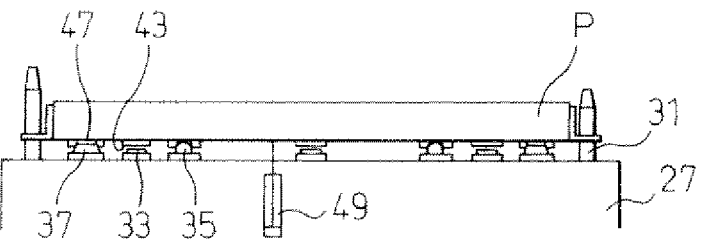

When pallet position confirmation system 49 confirms that pallet P is elevated by lift pins 35 to a position where support pin abutting surfaces 43 of pallet P separate from support pins 33, as shown in FIG. 4D, support pins 33 are lowered. Next, as shown in FIG. 4E, lift pins 35 are lowered to make taper cones 37 on table 27 engage with complementarily shaped taper holes 47 of pallet P and accurately arrange pallet P at a desired position on table 27. At this time, pallet P is clamped at that position by clamp devices 51. In this way, pallet P is finally positioned.

When pallet position confirmation system 49 confirms that pallet P is lowered to the lowest lowered position, it is judged that the final positioning of pallet P has been completed and workpiece W on pallet P is machined by machine tool 13. After this, when workpiece W finishes being machined, pallet P is elevated from table 27 to obtain the state shown in FIG. 4B by a procedure reverse to the above. Conveyor wire 53 is attached to pallet P to again enable pallet P to be hoisted by crane 17, and then pallet P is moved to pallet standby station 15 or a downstream machining process. After workpiece W finishes being machined, it is also possible to use support pins 33 to lift pallet P from table 27.

Next, referring to FIG. 5, the overall configuration or pallet standby station 15 according to the present invention will be described.

Pallet standby station 15 includes a base 55 installed on the floor and a pallet pivot system 57 provided pivotably on base 55. Pallet pivot system 57 pivots 90 degrees about a pivot 58 between the position shown by the solid line in FIG. 5 and the position shown by the dotted line, so that an L-shaped pallet P can be moved between a horizontally laid state (the state shown by the solid line in FIG. 5 where the long part is at the bottom) and a standing state (the state shown by the dotted line in FIG. 5 where the short part is at the bottom). Therefore, it is possible to mount workpiece W on pallet P in safe position shown by the solid line in FIG. 5 where there is no danger of workpiece W falling off pallet P and then make the pallet stand up by pallet pivot system 57 so as to support pallet P in a state where workpiece W is easy to machine.

Further, base 55 is provided with a pallet position measuring device 59 for confirming that pallet P is arranged at a predetermined position on pallet pivot system 57 and a workpiece position measuring device 61 for confirming that workpiece W is mounted at a predetermined position on pallet P. In the embodiment shown in FIG. 5, as pallet position measuring device 59 and workpiece position measuring device 61, contact type position detectors bringing pins into contact with the pallet or workpiece and detecting the positions of the pins so as to measure the position of the object are used, but noncontact type position detection systems using laser beams or magnetism may be used.

In pallet pivot system 57 of pallet standby station 15 as well, to accurately arrange pallet P at a desired position, guide pins 63, lift pins, support pins, and taper cones similar to those of table 27 of FIG. 3 are provided at positions corresponding to guide holes 41, support pin abutting surfaces 43, locate holes 45, and taper holes 47 of pallet P on the part becoming the bottom in the state shown by the dotted line in FIG. 5. Note that, in FIG. 5, only a guide pin 63 is shown.

When positioning pallet P on pallet pivot system 57, pallet pivot system 57 is pivoted to the position shown by the dotted line in FIG. 5, and then the worker manually operates crane 17 so that guide pins 63 of pallet pivot system 57 are inserted into guide holes 41 of pallet P. Since the rest of the procedure is similar to the case of positioning pallet P on table 27, the explanation thereof will be omitted. Further, since the action and effect of guide holes 41, support pin abutting surfaces 43, locate holes 45, and taper holes 47 of pallet P and guide pins 63, lift pins, support pins, and taper cones of pallet pivot system 57 are similar to the action and effect between table 27 and pallet P, the explanation will be omitted.

The invention claimed is:

1. A machine tool having a pallet mounting table for placing a pallet thereon, wherein said pallet mounting table comprises a plurality of guide pins having tapered front ends proximal to the pallet placed on the pallet mounting table, an elevatable lift pin elevatable relative to a top surface of the pallet mounting table and having a spherical front end proximal to the pallet placed on the pallet mounting table, and a taper cone having a tapered outer peripheral surface;

said pallet comprises top and bottom surfaces and two brackets provided on respective side surfaces of said pallet that join the top and bottom surfaces such that the two brackets laterally project in respective side directions from a respective one of the side surfaces of the pallet;

wherein each bracket is formed with a guide hole into which a respective one of the guide pins is inserted for rough positioning of said pallet; and wherein the bottom surface of said pallet is formed with a locate hole having a tapered inner peripheral surface and engaging with said spherical front end of said lift pin for precision positioning of said pallet, and is formed with a taper hole having a complementary shape with said taper cone and engaging with said taper cone for final positioning of said pallet.

2. The machine tool according to claim 1, wherein said pallet mounting table is provided with an elevatable support pin elevatable relative to the top surface of the pallet mounting table and having a flat front end surface proximal to the pallet placed on the pallet mounting table, and the bottom surface of said pallet is provided with a flat support pin abutting surface abutting against the flat front end surface of the support pin.

3. The machine tool according to claim 2, further comprising a stopper abutting against a side surface of the pallet to stop said pallet at a predetermined position on said pallet mounting table.

4. The machine tool according to claim 1, further comprising a stopper abutting against a side surface of the pallet to stop said pallet at a predetermined position on said pallet mounting table.

* * * * *